July 22, 1924.
F. T. WESTON
LAMINATED SPRING
Filed Oct. 22, 1923
1,502,167
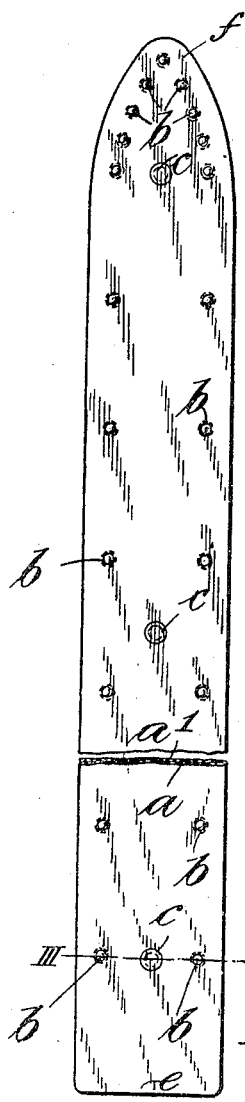
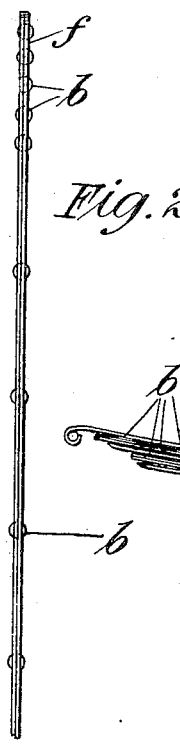
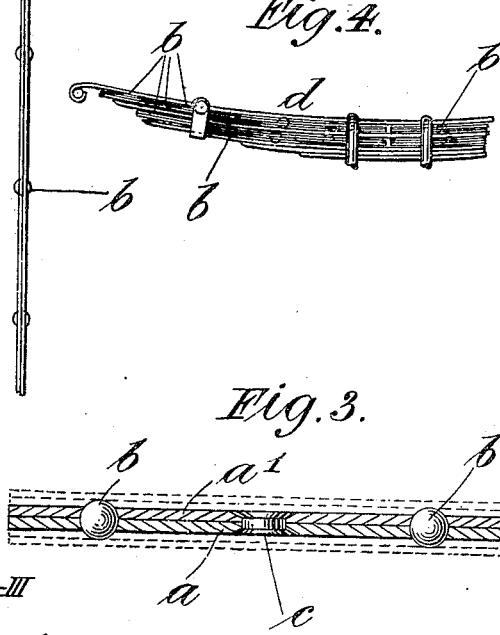
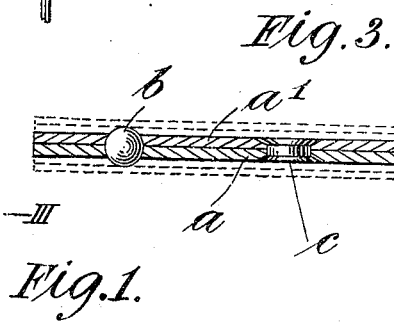
Inventor
Frederick T. Weston,
By Henry Ortt
Atty.

Patented July 22, 1924.

1,502,167

UNITED STATES PATENT OFFICE.

FREDERICK THOMAS WESTON, OF LONDON, ENGLAND.

LAMINATED SPRING.

Application filed October 22, 1923. Serial No. 670,082.

*To all whom it may concern:*

Be it known that I, FREDERICK THOMAS WESTON, a subject of the King of Great Britain, residing at No. 3, Pembroke Mews, Belgrave Square, Halkin Street, London, England, have invented certain new and useful Improvements in or Relating to Laminated Springs, of which the following is a specification.

This invention comprises improvements in or relating to laminated springs, and the principal object of the invention is to improve anti-friction devices of the kind comprising balls or rollers carried in sheet metal cages adapted for insertion between the leaves of laminated springs such as are used on vehicles, for the purpose of improving the spring action.

According to this invention, a system of balls or rollers is held in a cage constructed of two perforated blades held one on the other and fastened together with their inner surfaces in close contact. These anti-friction devices when inserted between the leaves of laminated springs on motor cars, are so effective that they not only prevent excessive vibration of the body supported on the spring, but also substantially reduce the risk of skidding.

In order to enable the invention to be readily understood reference is made to the accompanying drawing in which:—

Figure 1 is a plan of an anti-friction device constructed in accordance with these improvements.

Figure 2 is an edge view of a portion of Figure 1.

Figure 3 is a transverse section to a larger scale, on the line III—III of Figure 1.

Figure 4 is an elevation of a spring having the improved anti-friction devices applied between certain of its leaves.

According to the construction seen in Figures 1 to 3, the improved anti-friction device comprises a ball cage formed of two thin steel blades $a$ $a'$ having a number of holes drilled through them at appropriate points. These holes are countersunk, as by the formation of a suitable concavity around each hole in one surface of each blade. The blade $a$ is laid flat and a hard steel ball $b$ is placed in each concavity or countersink thereof. The companion blade $a'$ is then laid down flat upon the first, as seen in Figure 3, and so that its concavities or countersinks come down upon the balls $b$ arranged on the blade $a$. The two blades with their respective surfaces in contact are then fastened together, as by a line of rivets $c$. Three rivets may be sufficient along the centre line of the blades, as shown, one near each end and one in the middle as indicated in Figure 1. The balls $b$, enclosed between the concavities, project through the holes beyond the outer surfaces of the blades as will be seen from Figures 2 and 3.

A cage device of this blade-like construction is inserted between the leaves of a laminated spring $d$, as indicated in Figure 4. This is accomplished by loosening the clamping bolts of the spring so as to permit the leaves to be separated sufficiently for the insertion of the anti-friction device. It is generally found to be advantageous in a motor vehicle spring, to insert one blade device between the top leaf and the second leaf and a second blade device between the second and third leaves. However, all leaves of a laminated spring may be separated by the interposition of these blade devices if desired. In the case of the semi-elliptic spring illustrated in Figure 4, the blade devices may be made of a little less than one half the length of the appropriate leaves of the spring, so that one blade device would be inserted from the left hand end and a second blade device would be inserted from the right hand end. The inner ends of the blade devices would be cut off square, as shown in Figure 1 at $e$, and that end would be inserted so as to come about to the middle of the spring. The opposite end would be shaped, as shown at $f$ in Figure 1, so as to conform with the shaping of the ends of the leaves of the spring and this end would coincide with the end of the leaf upon which it rests after insertion. With this construction, the blade devices are applicable to existing springs merely by loosening the clamps, inserting the devices and re-tightening the clamps, the blade devices being then reliably secured in position in the springs. However, the blade devices may be made of the same length and shape as the leaves of the springs upon which they are to rest, in which case it is generally necessary to take the spring to pieces in order to position the blade devices between the desired leaves of the spring.

When the blade devices are in place, any flexing of the spring causes the leaves to rub upon the anti-friction bearing provided by the projecting portions of the balls, instead of the surface of one leaf rubbing frictionally against the surface of another leaf.

As will be seen from Figure 1, the holes for the balls are advantageously drilled at a uniform distance apart along the respective side edge portions of each blade. Also, they are drilled around the shaped end portion of each blade but at a less distance apart for the reason that the end portions of the leaves of the spring are subjected to the greatest amount of rubbing action and therefore need more points of anti-frictional bearing.

Obviously, by suitably shaping the holes in the plates $a$ $a'$ short rollers, the axes of which extend transversely, of the said plates, may be used instead of balls $b$ as herein described.

It will be noted that my construction differs from similar devices in the following particulars:

The perforations are shaped wholly within the blade thickness, there being no struck up or marginal portions around the perforations for the purpose of caging the balls. My blades have flat surfaces, and by holding the balls within the thickness of the blades, I avoid the releasing of the balls from the blade when the blade is flexed.

My blades are self-contained units, and in this respect differ from those structures where the anti-friction devices are free to fall out. My blades are not short shoes for the tips of the spring leaves only, but are co-extensive with the spring leaves, and need no special securing devices but are held by the spring clips usually present in springs.

My blades are very flexible, and freely follow the bending of the spring leaves, and are therefore free of lateral flanges or partial flanges that reduce the flexibility.

The anti-friction devices are placed more closely together where the maximum wear between the leaves occurs, i. e. near the tips of the spring leaves, and less closely toward the holding clips, where little flexure occurs, and are absent at those portions where no flexure occurs.

These units have proven by actual use to fulfil the requirements, not only when they are included in the spring by the manufacturer, but are easily inserted without dismantling a spring already installed on a vehicle.

I claim

1. An improved anti-friction device for laminated springs comprising two flexible perforated blades co-extensive with the leaves of the springs and fastened flat against each other with the perforations in register and anti-friction devices retained in and protruding through the said perforations forming a self-contained structure free to partake of the flexure of the springs, substantially as set forth.

2. An improved anti-friction device for laminated springs, comprising two flexible perforated blades co-extensive with the leaves of the springs and fastened flat against each other with the perforations in register, the said perforations constructed for the caging of anti-friction balls or rollers which protrude through the perforations in the blades forming a self-contained structure free to partake of the flexure of the springs without releasing said balls or rollers, substantially as set forth.

3. An improved anti-friction device for laminated springs, comprising two flexible perforated blades co-extensive with the leaves of the springs and fastened flat against each other with the perforations in register, the said perforations being more widely spaced apart along the straight side edge portions of the blades than at the end portions of the blades, and anti-friction devices retained in and protruding through said perforations forming a self-contained structure free to partake of the flexure of the springs without releasing the anti-friction devices, substantially as set forth.

4. An improved anti-friction device for laminated springs, comprising two flexible perforated blades substantially co-extensive with the spring leaves having shaped ends conforming to the shape of the spring leaf ends and fastened flat against each other with the perforations in register, a wider spacing apart of the perforations being adopted along the straight side edge portions of the blades than around the shaped end portions, and anti-friction devices retained in and protruding through said perforations said device forming a self-contained unit free to partake of the flexure of the springs without releasing the anti-friction devices, substantially as set forth.

5. An improved anti-friction device of the character referred to, in which the perforated blades are made of two portions, each a little less than half the length of the appropriate leaves of the laminated spring and a self contained unit free to partake of the flexure of the spring, substantially as and for the purpose described.

6, An improved anti-friction device for laminated springs, comprising two thin flexible steel blades having counter-sunk perforations at appropriate points free of projecting margins and substantially co-extensive with the spring leaf and fastened together flat against each other with the perforations in register and anti-friction balls or rollers enclosed between the concavities formed by the countersinks in the blades and protruding through such perforations, said device forming a self-contained unit free to partake of the flexure of the springs without releasing the anti-friction balls or rollers, substantially as set forth.

7. An anti-friction unit for insertion between the leaves of a laminated spring, comprising two thin flexible steel blades of a little less than half the length of the appropriate leaves of the laminated spring and having countersunk perforations at appropriate points free of projecting margins, the said blades being fastened together flat against each other with the perforations in register and anti-friction devices enclosed between the concavities formed by the countersinks in the blades and protruding through such perforations, said unit self-contained and partaking of the flexure of the springs without releasing the anti-friction devices, substantially as set forth.

8. An anti-friction unit for insertion between the leaves of a laminated spring comprising two thin flexible steel blades of a little less than half the length of the appropriate leaves of the spring and having one end cut off square and the other end shaped so as to conform to the shaping of the ends of the spring, the said blades having perforations along the side edges and perforations around the shaped end and the first-mentioned perforations being spaced wider apart than those last-mentioned, means for fastening the plates together flat against each other with the perforations in one plate in register with the perforations in the other, and anti-friction balls retained between the perforations in the blades and protruding through such perforations so as to present anti-friction surfaces, said unit self contained and free to partake of the flexure of the spring without releasing the balls, substantially as set forth.

9. An anti-friction unit for insertion between the leaves of a laminated spring comprising two thin flexible steel blades of a little less than hâlf the length of the appropriate leaves of the spring and having one end cut off square and the other end shaped so as to conform to the shaping of the ends of the spring, the said blades having countersunk perforations along the side edges and similar perforations around the shaped end and the first-mentioned perforations being spaced wider apart than those last-mentioned, means for fastening the plates together flat against each other with the perforations in one plate in register with the perforations in the other and anti-friction balls retained between the concavities formed by the countersinks in the blades and protruding through such perforations so as to present anti-friction surfaces said unit self contained and free to partake of the flexure of the spring without releasing the balls, substantially as set forth.

10. An anti-friction unit composed of two flexible steel blades having perforations substantially free from marginal projections and fastened flat together by rivets, and balls held between the blades in the registering perforations and projecting slightly therefrom, said unit self contained, substantially co-extensive with the spring blades between which they shall be inserted and free to partake of the flexure of the spring without releasing the balls.

FREDERICK THOMAS WESTON.